May 9, 1961 L. ZELIGOWSKY ET AL 2,983,159
CROSSHEAD COLUMN LOCK
Filed Aug. 3, 1960 3 Sheets-Sheet 1

INVENTORS
Leo Zeligowsky
BY Winfield S. Gibbs.
Wm. R. Glisson
ATTORNEY

INVENTORS.
Leo Zeligowski
Winfield S. Gibbs.
BY Wm. R. Glisson
ATTORNEY

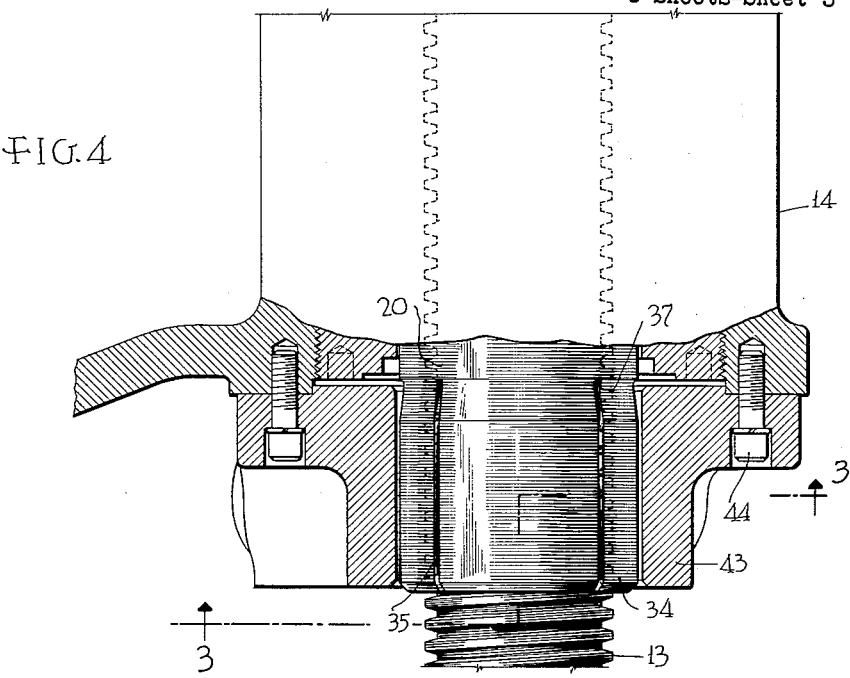
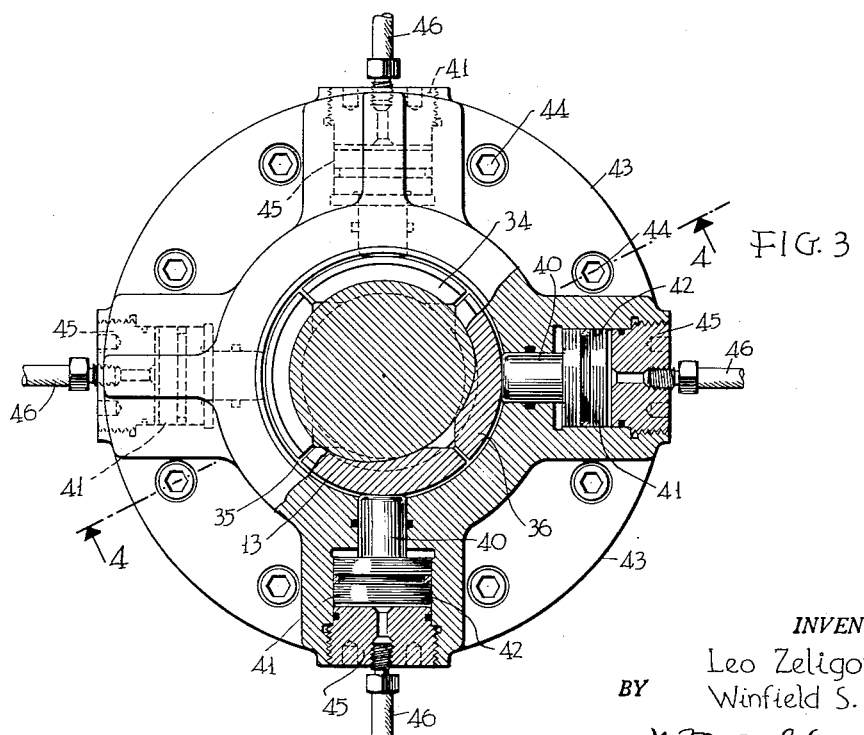

United States Patent Office 2,983,159
Patented May 9, 1961

2,983,159
CROSSHEAD COLUMN LOCK
Leo Zeligowsky, Narberth, and Winfield S. Gibbs, Croydon, Pa., assignors to The Budd Company, Philadelphia, Pa., a corporation of Pennsylvania
Filed Aug. 3, 1960, Ser. No. 47,299
6 Claims. (Cl. 74—424.8)

This invention relates to a crosshead column lock, as for testing machines, and has for an object the provision of improvements in this art.

One of the particular objects of the invention is to provide improved means for locking a threaded sleeve on a threaded column.

Another object is to provide a column locking means which operates very rapidly.

Another object is to provide column locking means which eliminates all backlash when locked.

Another object is to provide column locking means which utilizes both a radial clamping and an axial thread-wedging action.

Another object is to provide an integral screw sleeve which has separate elements for traversing and locking.

Another object is to provide locking means which does not bind during traversing movements.

Another object is to provide locking means which does not alter the axial position of the threaded sleeve on the threaded column when locking it.

Another object is to lock the sleeve securely in any rotational position on the column.

The above and other objects, advantages and features of novelty will be apparent from the following description of an exemplary embodiment of the invention, reference being made to the following description wherein.

Figure 2:
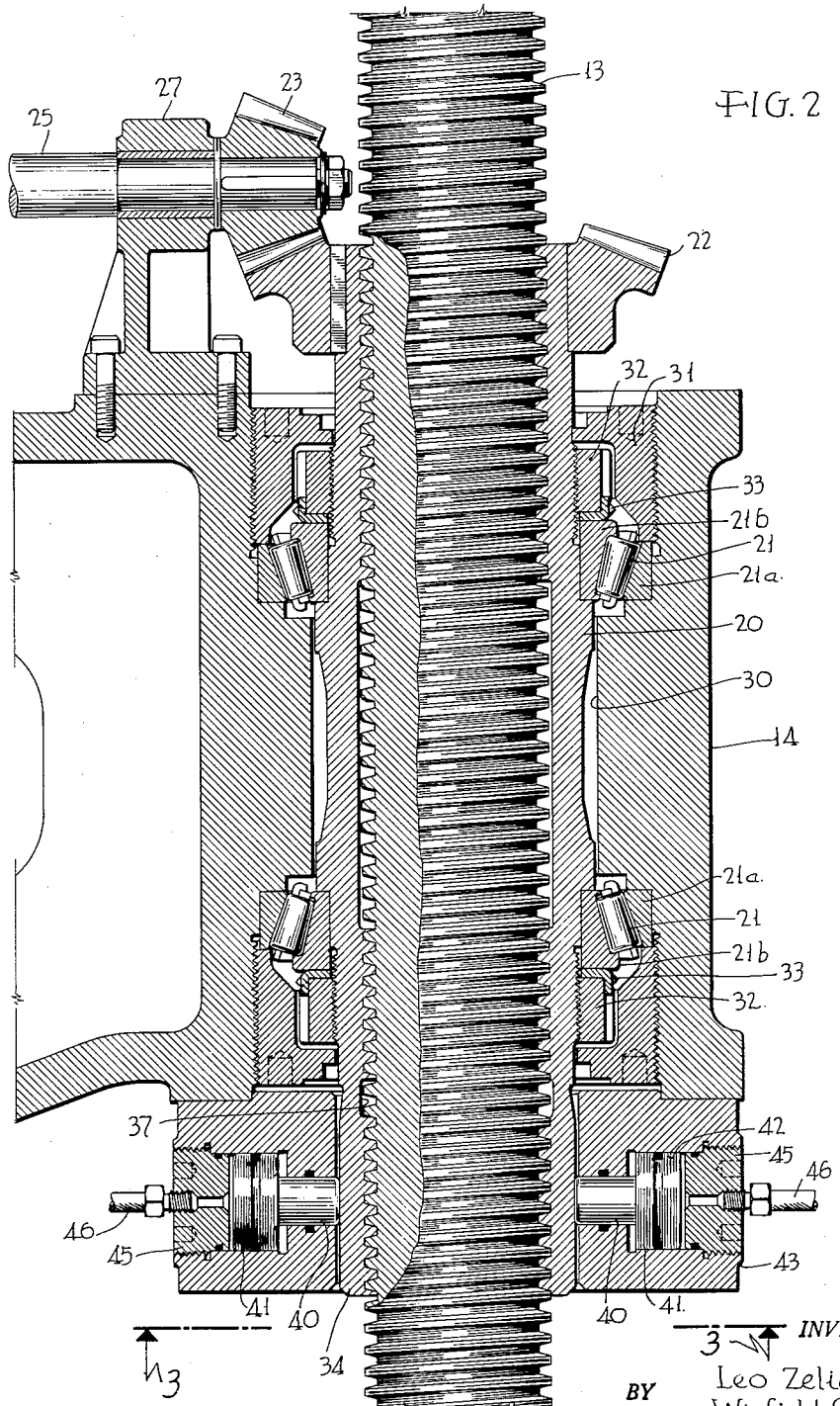
Fig. 2 is an enlarged view of the parts shown in vertical section in the zone indicated by broken lines in Fig. 1.

Fig. 3 is a bottom plan view, partly in horizontal section, taken on the line 3—3 of Figs. 2 and 4; and Fig. 4 is a vertical section taken on the line 4—4 of Fig. 3.

Figure 1:
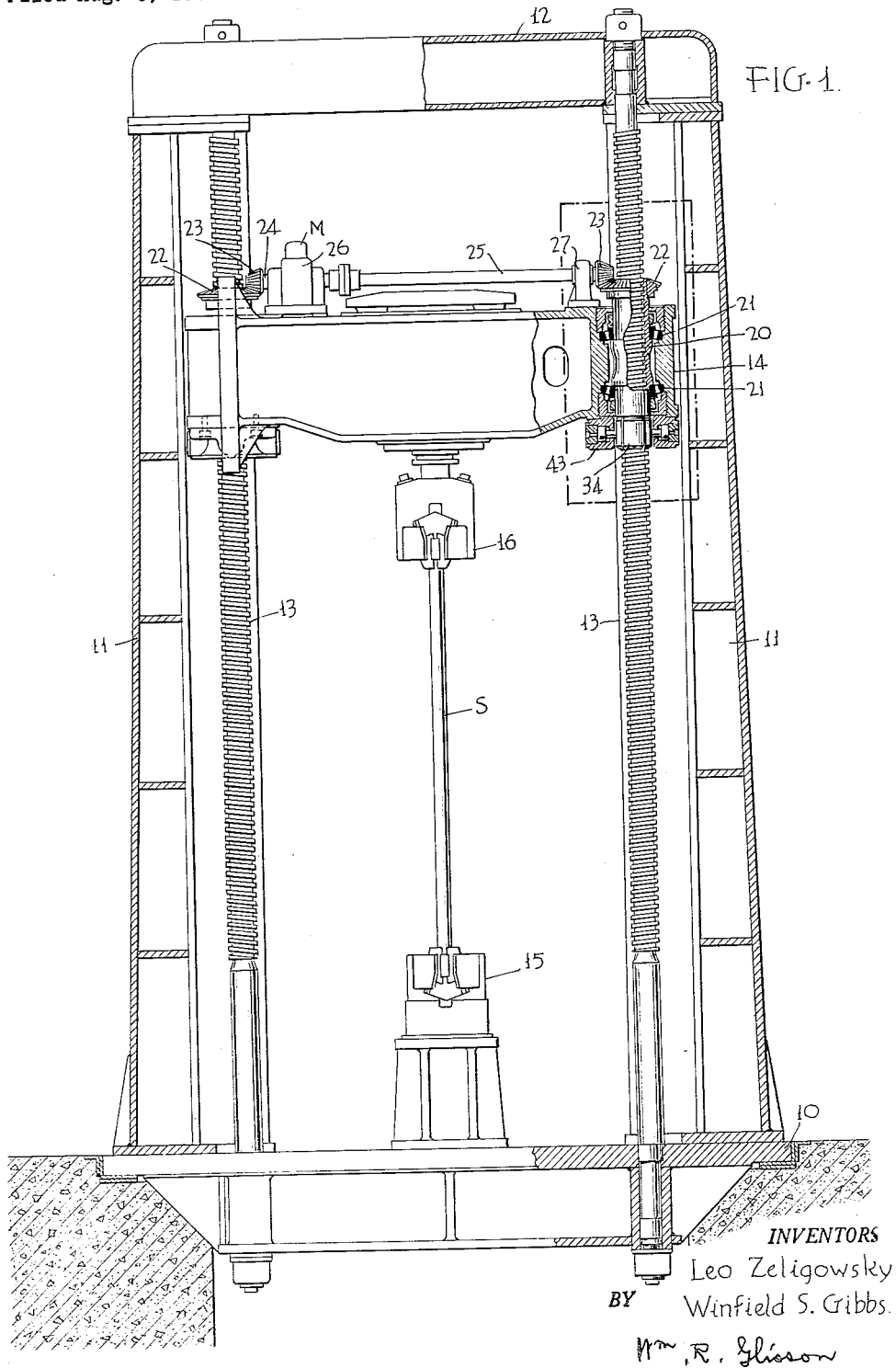
Fig. 1 is a front elevation of a testing machine embodying the invention.

The testing machine shown in Fig. 1 comprises a base 10, vertical supports 11, a fixed head 12 carried thereby, screw columns 13 secured to the base 10 and the fixed head 12, and a movable crosshead 14 traversably mounted on the screw columns 13. Specimen gripping heads 15 and 16 for a specimen S are carried by the base 10 and the crosshead 14 respectively.

On each threaded column 13 there is provided a threaded traversing sleeve or nut 20 mounted in thrust bearings 21 in the crosshead. Each sleeve 20 is provided at the upper end with a bevel gear 22 fast thereon and the bevel gears are driven by bevel pinions 23 fast on shaft 24, operated by a reversible motor M, the shaft being driven from a gear box 26 and having suitable bearing support on the crosshead. The shaft has bearings in the gear box 26 and a bearing support 27 near its outer end.

One sleeve 20 is shown in section at the right side of Fig. 1 and is shown enlarged and in greater detail in Figs. 2, 3 and 4. Here it is seen that the crosshead 14 has an axial bore 30 of various diameters to receive the sleeve, to seat the outer bearing races 21a and to take the threaded race clamp collars 31. The sleeve is shouldered to take the inner bearing races 21b and these are held by clamp collars 32, lock washers 33 with ears bent into notches of the collars 32 being interposed to hold the parts secure.

The sleeve or nut 20 at its lower end carries rigidly thereon, and preferably, as shown, formed integrally therewith, a threaded sleeve extension 34 which is provided with slits 35 to form a plurality of yieldable arcuate segments 36 (four shown here) which are adapted to be bent inward to clamp upon the cloumn 13. The sleeve is reduced at 37 at the upper end of the slits to provide flexibility of the segments.

The threads on the column and sleeve are of the Acme type having tapered sides so when the segments 36 are forced inward they not only grip the column radially but also wedge axially against the threads of the column to resist axial movement and fully eliminate all backlash. When the segments are in normal position their threads do not bind on the column threads and the sleeve can turn freely on the column. Whether the crosshead is moving up or moving down the threads of its supporting sleeves always rest on the upper sides of the threads of the columns due to the weight of the crosshead and it is arranged that when the sleeves are clamped on the columns this position is maintained.

Means are provided for forcing the segments 36 inward to lock the sleeves on the columns. The means herein shown comprise radial push rods 40 of pistons 41 operating in cylinders 42 carried by a ring frame 43 which is secured to the crosshead 14 by cap bolts 44. Heads 45 close the outer ends of the cylinders and the heads are provided with pressure fluid pipe connections 46 which have fluid flow controls, not shown, by which fluid action on all pistons is produced simultaneously. There are at least as many push rods 40 as there are segments 36 and preferably the same number as there are segments. No matter where the sleeve stops there will always be at least one push rod engaging it and when a slit 35 stops beneath a push rod there will be two push rods acting on each segment, one at either edge since the push rods are large enough to span the slits.

It is thus seen that the invention provides an improved screw column lock which is simple, efficient, dependable and easily operated for the objects set forth.

While one embodiment has been described for purposes of illustration it is to be understood that there may be various embodiments and modifications within the general scope of the invention.

What is claimed is:

1. Column locking means, comprising in combination, a threaded column, a crosshead traversable along the column, a threaded sleeve rotatably mounted in said crosshead and threaded on said column, means retaining said sleeve against axial movement on said column, a threaded extension on said sleeve and threaded on said column, said extension having a plurality of segments divided by axial slits, and means for forcing said extension segments radially inward to grip the column.

2. Column locking means as set forth in claim 1, wherein the threads on said column, said sleeve and said sleeve extension are tapered on the sides whereby the threads of said extension segments wedge axially on the threads of said column when the segments are forced inward.

3. Column locking means as set forth in claim 1, wherein said means for forcing the segments inward comprise radially movable power push rods, there being at least as many push rods as segments.

4. Column locking means as set forth in claim 3, wherein the number of segments and push rods is equal.

5. Column locking means as set forth in claim 3, wherein said push rods are operated by fluid pressure actuated pistons operating in cylinders carried by a ring frame secured to the crosshead.

6. Column locking means as set forth in claim 1, wherein said extension is formed integrally with said sleeve with a reduced section between for flexibility of said segments.

References Cited in the file of this patent

UNITED STATES PATENTS

| | | |
|---|---|---|
| 2,462,809 | De Crane | Feb. 22, 1949 |
| 2,724,978 | Morrell | Nov. 29, 1955 |
| 2,879,673 | Passman | Mar. 31, 1959 |